SELF-ADJUSTING MOVABLE JOINT DEVICE

Original Filed June 24, 1966 4 Sheets-Sheet 1

INVENTORS
WILLIAM A. SCHEUBLEIN JR.
LOUIS P. FISTER
BY Gravely Lieder & Woodruff
ATTORNEYS INVENTORS
WILLIAM A. SCHEUBLEIN JR.
LOUIS P. FISTER
BY Gravely Lieder & Woodruff
ATTORNEYS

SELF-ADJUSTING MOVABLE JOINT DEVICE

Original Filed June 24, 1966 4 Sheets-Sheet 3

INVENTORS
WILLIAM A. SCHEUBLEIN JR.
LOUIS P. FISTER
BY
Gravely, Lieder & Woodruff
ATTORNEYS

SELF-ADJUSTING MOVABLE JOINT DEVICE

Original Filed June 24, 1966 4 Sheets-Sheet 4

INVENTORS
WILLIAM A. SCHEUBLEIN JR.
LOUIS P. FISTER
BY
Gravely, Lieder & Woodruff
ATTORNEYS United States Patent Office Re. 27,114
Reissued Apr. 6, 1971

27,114

SELF-ADJUSTING MOVABLE JOINT DEVICE

William A. Scheublein, Jr., Ballwin, and Louis P. Fister, St. Louis, Mo., assignors to Moog Industries, Inc., St. Louis, Mo.

Original No. 3,401,966, dated Sept. 17, 1968, Ser. No. 560,334, June 24, 1966. Application for reissue May 20, 1969, Ser. No. 830,904
Int. Cl. F16c *11/00*
U.S. Cl. 287—93 9 Claims

Matter enclosed in heavy brackets [ ] appears in the original patent but forms no part of this reissue specification; matter printed in italics indicates the additions made by reissue.

*ABSTRACT OF THE DISCLOSURE*

*A self adjusting wear compensating movable joint device having relatively rotatable movable housing and stud components, with the stud head operatively mounted in the housing and secured on its bearing seat by wear take-up adjusting means which is rendered operative upon relative rotation in one direction between the housing and the stud to take-up looseness of the stud head on its bearing and to become inoperative when the relative rotation between the stud and the housing might tend to undo the wear take-up, or when the wear take-up has been completed so as not to overload or strain the working components.*

This invention relates to movable joint devices for interconnecting two members or parts that are relatively movable, and the invention is especially directed to movable joint devices that are self-adjusting so that looseness developed by wear may be avoided substantially as fast as it becomes a factor in the normal function of the device.

Movable joint devices in the past have been made with manually adjustable means for periodically taking up looseness when the wear becomes significant. Such devices have also incorporated spring means for the same general purpose, and lately resilient means have been utilized in the form of synthetic bodies, inserts and the like. Generally the movable joint devices of the foregoing types and embodying the enumerated means have been expensive, have entailed production problems, and have not been sufficiently durable to deliver the expected life so that frequent need for replacement has been the result.

It is, therefore, a primary object of this invention to provide movable joint devices with simple and new means for overcoming the problems pointed out in present types of movable joint devices.

It is also an important object of this invention to provide movable joint devices with self-adjusting means which continuously seek to adjust out looseness as wear occurs, and for this purpose such means is made to operate on relative changes in frictional engagement between predetermined surfaces within the device, and upon the occurrence of relative motion of the device when operating.

Another object of this invention is to provide a movable joint device with a simple assembly of parts in which normal operation in service will develop relative movement between selected parts of the assembly, which movement can be relied upon to compensate for wear and adjust out looseness.

It is a further object of this invention to provide a wear compensating unit that can be incorporated in a movable joint device to become self energized upon relative movement between the major components of the device.

Still a further object of this invention is to provide a movable joint device having a housing and a headed stud therein with a projecting shank, and to dispose within the housing an assembly of components that will substantially continuously take up looseness from wear upon relative rotary movement between the housing and the stud.

A further object of this invention is to provide a movable joint device having two principal parts which may have relative motion of rotary or rotary and angular character, and to embody means between these principal parts which will respond to rotary character of motion for compensating for wear.

Yet another object of this invention is to provide a movable joint device having the foregoing features and to adapt the device for applications to automotive uses as idler arms and tie rod ends in the steering mechanism thereof, or for application as steerable wheel mounting ball joints.

Other objects and advantages of this invention will be set forth in the following specifications which relates to certain preferred forms of movable joint devices disclosed in the accompanying drawings, wherein.

The following description of the various movable joint devices will refer to vehicle applications, and particularly to steerable wheel mechanism in which idler arms and tie rod ends play an important part. The devices generally have a housing with a socket which supports the headed end of a stud in position with its shank projecting therefrom. The housing is connected to one part of the vehicle or steerable mechanism while the stud shank is connected to another part such that relative movement of the housing and stud may take place. The relative movement may be either rotary or rotary and angular, and advantage is taken of the rotary movement to actuate wear compensating means mounted in the housing in contact with the stud head, thereby rendering such means self-adjusting for the purpose of taking up looseness as wear occurs. The wear compensating means is organized to be nonreversible so that looseness is continually corrected as the need arises. To achieve this mode of operation, the following conditions must obtain:

(1) At least two members of the joint device must be engaged such that as relative rotary motion occurs the wear compensating means will be actuated to correct looseness in the axial direction of the stud.

(2) The wear compensating means must develop differential driving forces during rotary movement such that one element develops a friction force responsive to actuator movement which is initially greater than any other friction force present in the assembly. The said one element is actuated until it reaches a maximum limit of friction at subtantially the setting when looseness is corrected, at which limit other friction forces in the assembly must become greater or dominant so that there will be slippage of the actuator, or the actuator will be rendered ineffective to prevent over correction which could bind the assembly.

(3) The wear compensating means must incorporate suitable provisions which will prevent the undoing of the looseness correction, but be always ready to correct for looseness as the friction forces play between the various elements of the wear compensating means.

Figure 1:
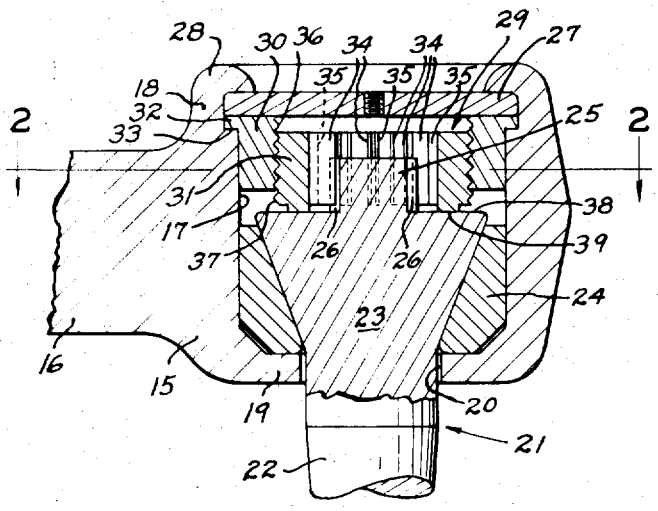
FIG. 1 is a vertical sectional view of a self-adjusting movable joint device adapted for use in an idler arm.
Figure 2:
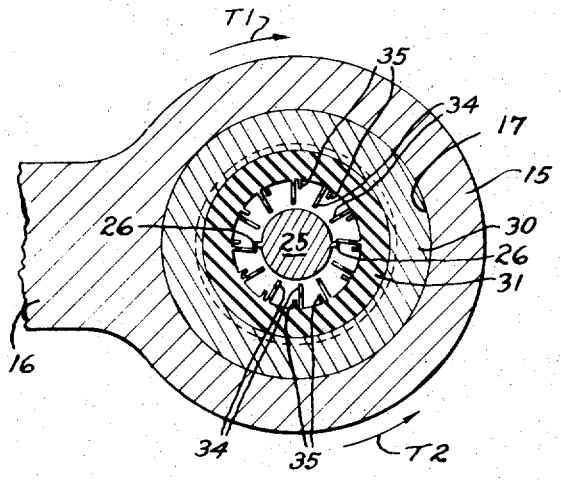
FIG. 2 is a transverse sectional view taken at line 2—2 in FIG. 1.

A self-adjusting idler arm assembly is disclosed in FIGS. 1 and 2. This assembly is mounted between the frame of the vehicle and the end of the center link opposite the connection of the pitman arm with this link. In the usual case the idler arm is provided with socketed housings at each end and what is shown in FIG. 1 is the housing at the frame end of the idler arm. The housing at the other end which is connected to the center link may be similar in character. The stud bearing in the housing socket has its shank connected to a frame bracket of suitable form.

The assembly includes a housing 15 at one end of an arm 16, the housing having a socket bore 17 therein which is open at the end 18 to receive parts to be described. The opposite end of the socket 17 is partially closed by a wall 19 in which aperture 20 is formed. A stud 21 has its shank 22 extending through aperture 20 so as to be free to rotate about its lengthwise axis relative to the housing 15 but not move or swing angularly. The stud 21 has a tapered headed end 23 which is mounted in a suitable bearing ring 24 seated in the socket 17 adjacent wall 19. The stud head 23 has an axial extension 25 thereon formed with opposite diametrically projecting arms 26. The extension 25 with its arms 26 is an actuator for determining the action of the wear compensating means 29. In operation the stud head 23 will rotate within the bearing ring 24.

The housing 15 includes as a part thereof a closure plate 27 in end 18, the plate 27 being secured by spinning over the end flange 28 of the housing. Between the plate 27 and the stud head 23 there is operably mounted the wear compensating means 29 which includes a first internally threaded ring element 30 and a second externally threaded ring element 31 engaged in the first element. The element 30 has a flange 32 which is held fixed on the shoulder 33 of the socket bore 17 by the periphery of the closure plate 27 when the housing flange 28 is spun over.

The second ring element 31 may be a molded or die-cast part which carries a plurality of circumferentially spaced and radially inwardly directed resilient fingers 34. Each finger 34, in the example shown, is molded into or may be an integral part of the element 31, and there are a like plurality of auxiliary extensions 35 which back-up one side of each resilient finger 34. These auxiliary extensions 35 may be molded into or be integral with the element 31. Each finger is more easily flexed in the direction of bending away from the back-up extension 35 than in the opposite direction. The difference in the ease of displacing or bending fingers 34 is due to the change in the length of the effective arms. As seen in FIG. 2 the projections 26 engaged with diametrically opposite fingers 34. As the stud head rotates in a counterclockwise direction (arrow T2) the full radial length of the fingers 34 is effective to make the fingers more limber or flexible than for clockwise rotation (arrow T1) as the back-up extensions 35 come into play to reduce the effective arm length for bending in the opposite direction.

In FIG. 1 it is observed that the ring elements 30 and 31 are relatively movably connected at threads 36 and 37 respectively. The threads engage with a friction force F1 and are given an inclination or "hand" that will cause ring 31 to advance axially toward the stud head end face 38 upon clockwise rotation of the projection 25 (arrow T1). The end face 39 of ring 31 bears upon the stud and face 38 with a friction force F2. The operation of the idler arm assembly will become clear as the description of FIGS. 1, 2 and 3 proceeds.

Figure 3:
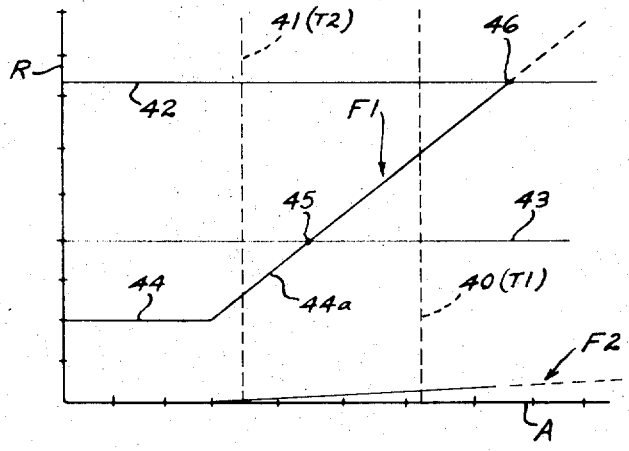
FIG. 3 is a graphic analysis of the operational characteristics of the device of FIG. 1.

First it should be pointed out in FIG. 3 that the graph shows torque loading along the abscissa A and friction reaction force along the ordinate R. The vertical line 40 represents the torque value at which actuator 25–26 will slip past fingers 34 upon rotation in the T1 direction, and the vertical line 41 is the torque value at which actuator 25–26 will slip past fingers 34 upon rotation in the T2 direction. Since the effort to bend fingers 34 is substantially constant, the lines 40 and 41 are vertical. The horizontal line 42 represents the friction value F1 required between threads 36 and 37 to cause the actuator 25–26 to override the fingers 34 and 35 in the T1 direction, and horizontal line 43 represents the friction value F2 between surfaces 38 and 39 to cause the actuator 25–26 to override the fingers 34 in the T2 direction.

When the idler arm of FIG. 1 is first assembled there is no contact at surfaces 38 and 39 so that F2 is zero, and is so indicated on the graph of FIG. 3. At the same time the friction force F1 between the threads 36 and 37 is relatively constant and small as is indicated at horizontal line 44 due to its being the result of the weight of the ring 31 resting on the ring 30 by the threads. It can be appreciated that by rotating the stud 21 in the T1 direction (FIG. 2) the element 31 will be rotated relative to the element 30 which is fixed in the housing 15. This will cause a threading reaction at the threaded friction surface F1 which will increase the friction at these surfaces beyond that generated merely by the weight of the ring 31. Thus, while the friction force F1 initially is a constant value (the effect of the weight of the ring 31 on the ring 30 as shown by line 44), the increase in the friction in the threads is shown by the inclination of the line 44a. It can be appreciated that there will be a friction force F2 developing between the lower end face 39 of the element 31 and the upper end face 38 on the stud head 23. This friction force increases to the point 45 where the friction force slope line 44a crosses the horizontal friction force line 43. This portion of the slope of the line 44a depicts the initial friction buildup between the elements 30 and 31 and the stud head 23. Once the value of the friction reaction force in the threads 36 and 37 increases beyond the line 43 there will then be present sufficient friction upon rotation of the stud head 23 in the counterclockwise or T2 direction, to permit slippage of the stud head surface 38 relative to the end surface 39 on the ring element 31. This will occur because the actuator 25–26 will be rotating in the direction T2 resulting in the element 26 bending the fingers 34 in the direction of least resistance. This action is desirable in order to overcome the tendency for stud head rotation in the counterclockwise direction to undo the adjustment of the element 31 in a direction to correct for axial looseness in the assembly.

Still referring to FIGS. 1, 2 and 3, it can be appreciated that the wear compensating means will operate upon stud head rotation in the clockwise direction to thread the element 31 down upon the surface 38 of the stud head. This action occurs because the resistance to bending of the fingers 34 is increased by the back-up action of the extensions 35. This effects a driving relation between the projections 26 on the actuator 25–26 which will first rotate the element 31 relative to the element 30 without the projections 26 passing over fingers 34. This constant corrective function upon rotation of the stud head in the T1 direction will go on until the friction force F1 in the threads 36 and 37 reaches the point 46 in the graph of FIG. 3. Any effort by the actuator 25–26 to increase the friction reaction force F1 in the threads 36 and 37 would normally tend to carry upwardly beyond the horizontal line 42. This is not possible because the design of the fingers 34 and the back-up extensions 35 is such that the projections 26 will slip past in the T1 direction by bending the fingers 34. When this point is reached the movable joint device is completely adjusted so as not to have any axial looseness, but it is not locked as the stud head 23 is rotatable in its bearing 24.

In view of the foregoing description, and as depicted in the graph of FIG. 3, it should now be understood that in normal operation the movable joint device of FIG. 1 will undergo an interplay of friction reaction force F1 and F2 with the actuator 25–26 acting on the fingers 34 and back-up extensions 35 so that the wear compensating means 29 will tend to adjust itself between the horizontal lines 42 and 43, or between the points 46 and 45. Any effort to increase the friction reaction force F1 upwardly from point 46 will cause the actuator 25–26 to override the fingers 34 in the T1 direction, and any rotation of the stud head 23 in the T2 direction will cause slippage at the friction reaction surface 38 and 39 so that the friction reaction force F2 will always be less than the friction force F1. Under this condition the stud head 23 will never rotate the element 31 in the T2 direction to increase axial looseness. This latter condition is highly undesirable and explains the reason for permitting the actuator 25–26 to override the fingers 34 in the T2 direction, rather than permit the element 31 to be rotated in the T2 direction relative to the fixed element 30. It is clear that the movable joint device above described can be made of suitable materials, in which case the housing 15, the stud 21 and the bearing 24 may be of suitable metallic materials, the element 30 may be of a suitable metallic material, and the element 31 may be of a suitable moldable material, such as Delrin.

Figure 4:
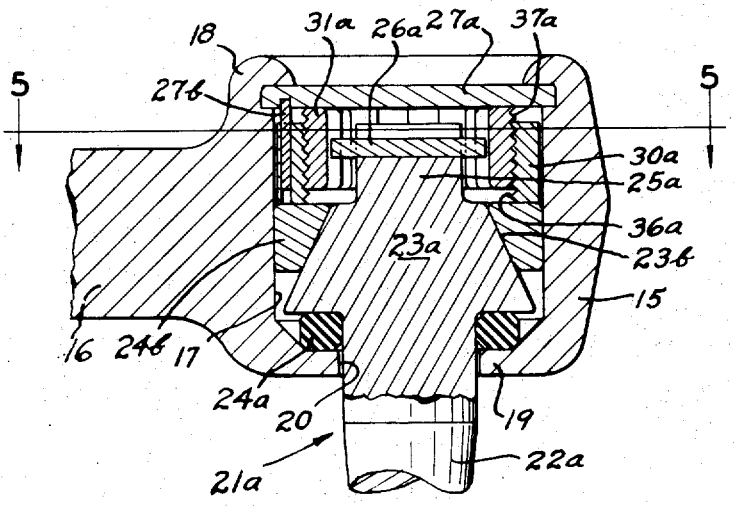
FIG. 4 is a vertical sectional view of a modified device applicable for idler arms.
Figure 5:
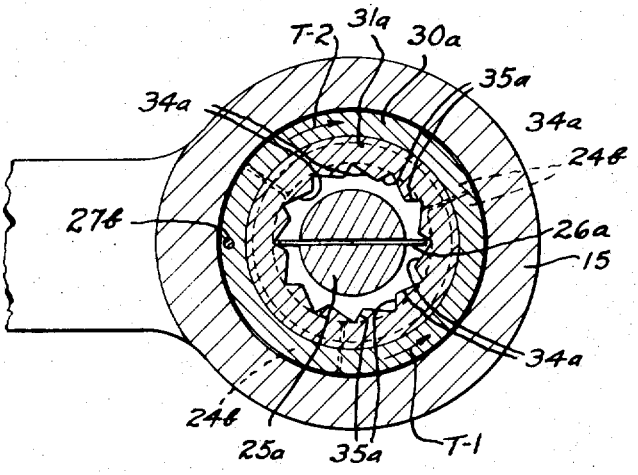
FIG. 5 is a transverse sectional view taken at line 5—5 of FIG. 4.

The modified construction shown in FIGS. 4 and 5 is similar to that shown in FIGS. 1 and 2, and where possible similar reference characters will be applied to similar parts. The housing 15 is at one end of an idler arm 16 and provides the socket bore 17 having the flange 18 at one end and a wall 19 with aperture 20 at the opposite end. A stud 21a has its shank 22a extending outwardly of the aperture 20 while the headed end 23a of the stud is mounted in the socket upon a first bearing 24a of suitable material, as Delrin, and a second bearing 24b composed of a plurality of segments (three is preferred) that mate with the tapered surface 23b of the stud head 23a. The bearing segments are forced down, as will appear, and maintain the stud centered and able to rotate about its longitudinal axis without looseness. There is a socket closure plate 27a secured by spinning over flange 18, and a key element 27b is mounted in the plate 27a.

The device of FIGS. 4 and 5 varies from the device of FIGS. 1 and 2 in that the first element 30a formed with the internal threads 36a is prevented from rotating in the socket by the key 27b engaging therewith, but this element is free to move axially. The second element 31a having the external threads 37a is formed with internal projections having variable slopes, rather than being arms with variable opposite bending reactions. In other words, in FIG. 5 the less sharply angled or sloped surfaces 34a are equivalent to the projections 34 in FIG. 2, and the more sharply angled surfaces 35a are equivalent to the back-up projections 35 in FIG. 2. The stud head 23a carries an actuator composed of the extension 25a having a diametral slot for supporting the spring element 26a. The actuator 25a–26a has substantially the same action as the actuator 25–26, in that it requires more torque to cause the ends of the spring 26a to slip past or override the slopes 35a than is required to override the slopes 34a.

The threads 36a and 37a are given the desired "hand" to result in the element 30a being forced to engage the bearing segments 24b and element 31a being forced to engage the closure plate 27a. This action is equivalent to the elements 30 and 31 in FIG. 1, in that there is a friction reaction force F1 developed in the threads 36a and 37a, and a friction reaction force F2 developed between the lower end of the element 30a and the bearing segments 24b. Thus, the graph of FIG. 3 will substantially illustrate the action which occurs in the assembly of FIGS. 4 and 5.

Correlating the graph of FIG. 3 with the device of FIGS. 4 and 5, it can be seen that graph line 44 represents the friction in threads 36a and 37a at the time of initial assembly when it will be just the weight of the element 31a that creates this force. Upon rotation of the stud 21a relative to the housing 15 in the T1 direction the elements 30a and 31a will be threadedly expanded between the plate 27a and the bearing segment 24b so that the force F1 will build up along line 44a through point 45 and toward point 46. Above point 45 the force F2 is not sufficient to influence the action of the elements 30a and 31a during relative rotation of the stud and housing in either direction, since the force F1 in the threads is so much greater. Thus on relative rotation in the T2 direction the actuator element 26a will easily ride over the projections 34a and not unthread the elements 30a and 31a. In the T1 direction the actuator element 26a will drive the element 31a until the point 46 on the graph line 44a is exceeded, at which time the axial looseness in the device is substantially eliminated and the actuator element 26a will ride over the projection slopes 35a.

Figure 6:
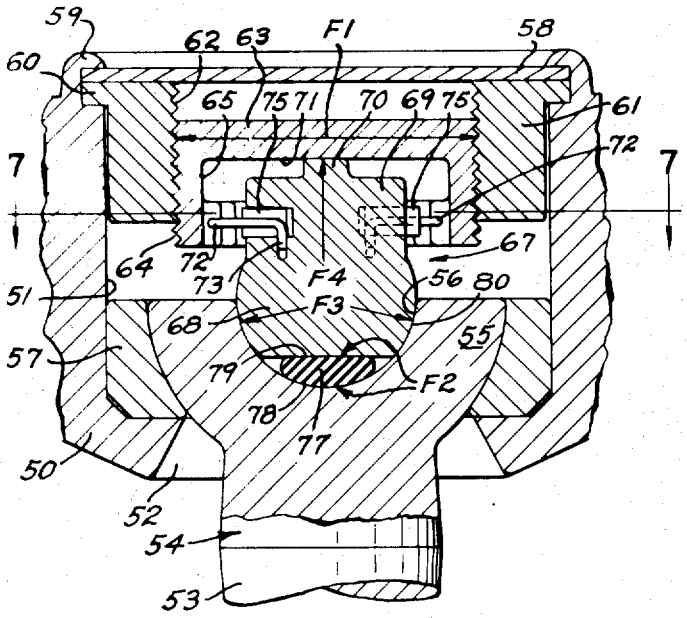
FIG. 6 is a vertical sectional view of a modified self-adjusting movable joint device adapted for use as a tie rod end.
Figure 7:
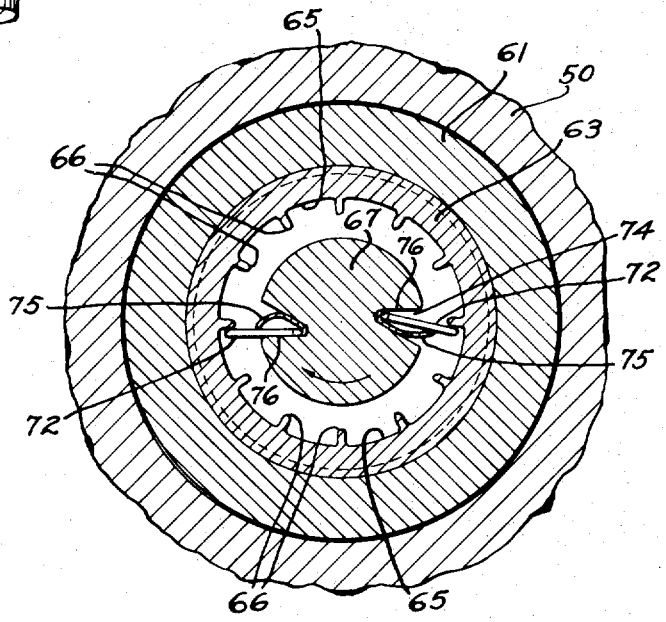
FIG. 7 is a transverse sectional view taken at line 7—7 in FIG. 6.
Figure 8:
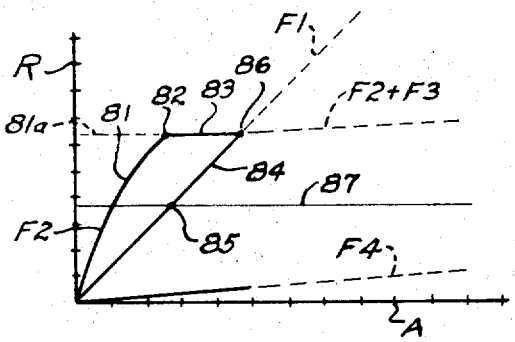
FIG. 8 is a graphic analysis of the operational characteristics of the device of FIG. 6.

Referring now to FIGS. 6, 7 and 8, it will be noted first that the assembly is representative of a tie rod end applicable to the steering linkage system of a vehicle. In this case there is a housing 50 having a suitable socket 51 formed with an aperture 52 to permit the shank 53 of a stud 54 to project therefrom, the stud 54 having a headed end 55 formed with a recess 56 therein. The head end 55 is suitably bearinged in a ring 57 in the housing 50 so that it will be free to swing angularly as well as rotate about the longitudinal axis of the shank 53. A cover plate 58 is secured on and forms a part of the housing 50 by the spun-over flange 59. The plate 58 and the flange 59 together act to secure the flange 60 of an element 61 in position. Element 61 has internally formed threads 62, and is similar to the element 30 previously described in FIG. 1. A second element 63 is provided with external threads 64 which mate with the threads 62 and this element 63 is provided with an internal bore 65 on which are formed a series of circumferentially spaced but radially inwardly inwardly directed projections 66 (FIG. 7).

Still referring to FIG. 6, the assembly is provided with an actuator 67 which includes a button element 68 having a semispherical end seated in the recess 56, and an outer end 69 having a surface projection 70 which engages on the adjacent surface 71 in the bore of the element 63. The actuator 67 also includes a pair of pins 72 which are pivotally mounted by inner-end 73 in the button 68 and whose radial portions extend outwardly toward the projection 66 in the element 63. Each pin 72 is mounted in a notch 74 formed in a diametrically opposite portion of the button 68. Also, each pin 72 is resiliently held by a suitable leaf spring 75 against one surface 76 of the notch 74. In this arrangement (FIG. 7) clockwise rotation of the actuator 67 relative to the element 63 cannot occur because the pin projections 72 are being held in abutment against the shoulder 76. On the other hand, counterclockwise rotation of the actuator 67 will move the pins 72 in such a manner that on encountering a projection 66 each will be free to yield because of the yieldable response of the leaf spring 75. This action is partly shown at the right hand side of FIG. 7.

Referring again to FIG. 6, the actuator 67 having its end 68 in the recess 56 is effective to retain a resilient element 77 therein, and to be in a position to compress the element 77 for increasing friction contact between the surface of the element 77 and the bottom surface 78 of the recess 56 and the spaced flattened surface 79 on the button 68. These surfaces are designed to generate a friction reaction force which will be hereafter referred to as force F2. The element 77 may be compressed to the extent permitted by the movement of the button 68 into the recess 56, and until the semispherical surface 80 thereon bottoms out on the sides of the recess 56. The friction reaction at these surfaces 56 and 80, will be hereinafter referred to as the friction force F3. It has previously been pointed out that the actuator 67 engages the element 63 at the upper projection 70 and the surfaces engaged here generate a friction force which will hereinafter be referred to as the friction force F4. The friction reaction force F1 will be generated by the engagement of the threads 62 and 64 between elements 61 and 63 respectively.

Looking now at FIGS. 6 and 8, and with some reference to FIG. 7, it will be appreciated that in the initial assembly of the movable joint device it is desirable to build-up the friction force F1 so that axial play or looseness in the assembly can be removed without binding the stud head 55 in its normal function to rotate and swing or oscillate in the housing 50. In the graph of FIG. 8 the abscissa A represents the applied load on the movable joint device and the ordinate R represents the friction reaction force generated in the various surfaces of the assembly as above described. Initially the friction force F4 will be quite insignificant since it is desirable to have the actuator 67 move in rotation with the stud head 55. This is achieved by the resilient element 77 having an initially large friction reaction force F2 which increases quite rapidly with applied load as indicated along the line 81 until it reaches a maximum force at which point the friction force F3 prevents any further increase in the friction force F2. The maximum point for friction force F2 is reached at the point 82, and thereafter the friction forces F2 and F3 are additive as represented by the line 83. In the initial steps the friction force F1 will be merely the weight of the element 63 on the threads 62 of element 61. This friction force is represented by the line 84 in the graph of FIG. 8 and becomes significant when the friction force value is above the value at point 85 and up to point 86. It is necessary to develop the friction force F1 to a value along the line 84 until it is above the point, 85, and in order to accomplish this it is necessary to gauge or set the leaf springs 75 to yield at a friction reaction value represented by the horizontal line 87, whereby on counterclockwise rotation of the actuator 67 the leaf spring 75 will permit the pins 72 to ride over the projections 66 and not affect relative rotation of the element 63 in the element 61.

Still referring to the disclosure in FIG. 6 and the graph in FIG. 8, it is pointed out that the friction reaction force F1 increases along the line 84 by reason of the rotation of the stud head 55 driving the actuator 67. The combined friction forces F2 and F3 in this stage are greater than the friction force F1, but as point 86 is reached the friction force F1 tends to become greater than the combined friction forces F2 and F3 for clockwise rotation of the actuator 67 relative to the element 63. Since the pins 72 cannot drive past the projections 66 in the element 63, it is necessary to permit the actuator 67 to slip in the recess 56 of the stud head 55, and this occurs from the point 86 of the graph of FIG. 8 and above, for value of the friction reaction force F1 in relation to the load applied on the movable joint device. Therefore, the actuator 67 will permit the various friction reaction forces to play back and forth between points 85 and 86 along line 84.

While element 77 is resilient in character, it is possible to apply a magnetic element in its place and this then requires that element 63 be nonmagnetic in character. The entire actuator 67 can be magnetic if desired. With a magnetic element the force F2 would be substantially represented by dotted line 81a in FIG. 8, and line 81 would be eliminated.

Figure 9:
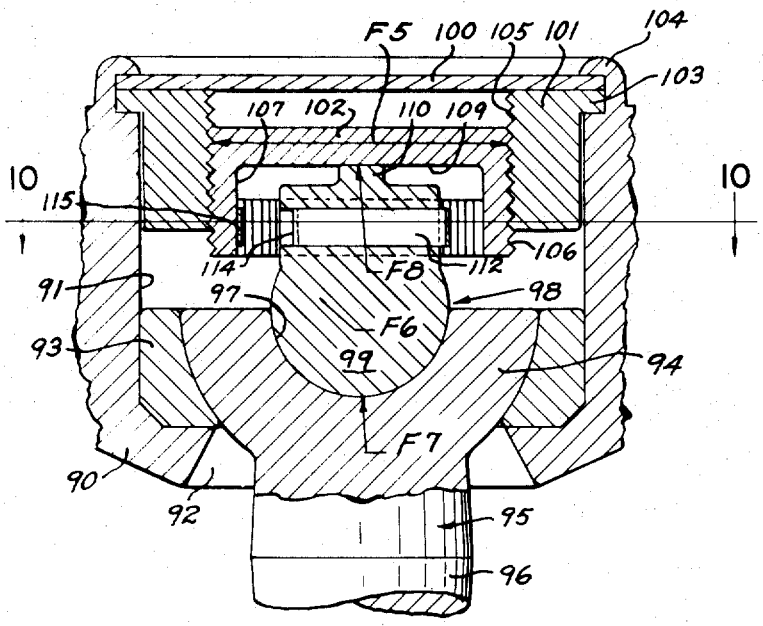
FIG. 9 is a vertical sectional view of a modified self-adjusting movable joint device useful as a tie rod end.
Figure 10:
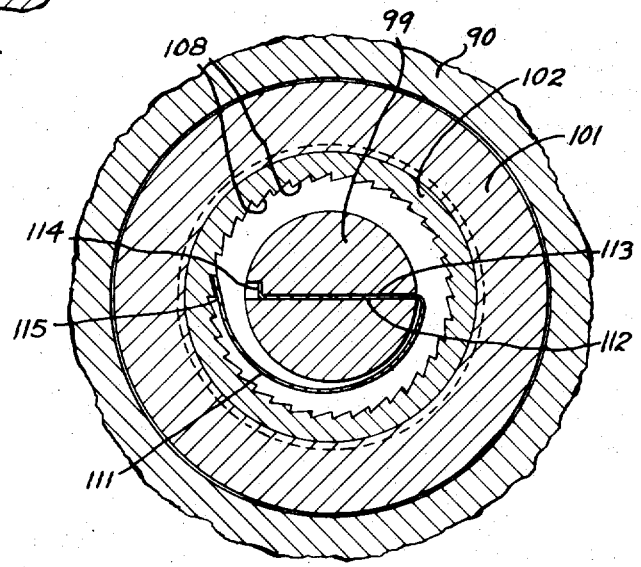
FIG. 10 is a transverse sectional view taken at line 10—10 in FIG. 9.
Figure 11:
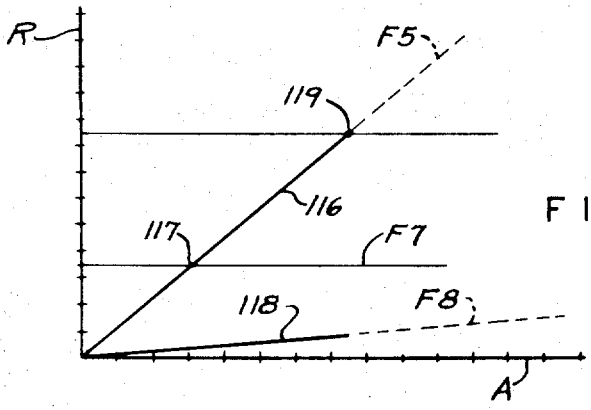
FIG. 11 is a graphic analysis of the operational characteristics of the device of FIG. 9.

Referring now to FIGS. 9, 10, and 11 there is disclosed a self-adjusting tie rod end in which the housing 90 is provided with an internal socket 91 having an apertured end 92 with a suitable bearing 93 therein for mounting at head end 94 of a stud 95 in which the stud shank 96 projects from the aperture 92. The stud head 94 is formed with a recess 97 which mounts an actuator 98. The actuator 98 has a semispherical end 99 seated in the recess 97.

In the upper portion of the housing 90 and retained therein by a cover 100, which is a portion of the housing 90, are cooperating elements 101 and 102. Element 101 is secured to the housing 90 at the flange 103, as this flange is clamped under the cover 100 by the spun-over lip 104 on the housing. The inner bore of the element 101 is formed with suitable threads 105. The element 102 is formed with external threads 106 engaged in the threads 105, and is also formed with an internal bore 107. The bore 107, as shown in FIG. 10, is formed with a plurality of inward projections or teeth 108 for a purpose which will presently appear. It can be seen in FIG. 9 that the element 102 engages the actuator 98 by having its end wall 109 engaged on the end face of the projection 110. The actuator 98 also includes a spring finger 111 having one end portion 112 seated in a cross slot 113 in the actuator 98 and secured therein by a locking end 114. The body of the spring finger 111 is then wrapped partially around the actuator 98 and has its outer end 115 directed to cooperate with the respective projections or teeth 108 in the inner bore 107 of the element 102.

In the following description of the assembly of FIG. 9 it will be noted that the friction reaction force F5 between the threads 105 and 106 respectively of elements 101 and 102 is represented in the graph of FIG. 11 by the line 116. In this graph the load applied on the tie rod assembly is shown along the abscissa A and the friction reaction force within the various parts of the assembly is shown along the ordinate R. Thus, the point 117 on the graph of FIG. 11 represents the value of the friction reaction force F7 between the abutting surfaces of the actuator end 99 and the recess 97 to cause the spring finger 111 to ride over the projections 108 in the nonadjusting direction of the assembly. The nonadjusting direction of the assembly seen in FIG. 10 will be with the actuator 98 rotating with the stud head 94 in a counterclockwise direction relative to the element 102. This means that the actuator 98 must rotate with the stud head 94 and cause slippage between the projection 110 and the surface 109 on the element 102. The friction reaction force developed in this surface is hereinafter referred to as friction force F8 and, as shown in the graph of FIG. 11, is represented by the line 118 and is relatively insignificant.

The operation of the tie rod assembly shown in FIG. 9 is depicted in the graph of FIG. 11, and normal operation thereof takes place between the point 117 and the point 119 on the line 116 which represents values of the friction reaction force F5 in relation to applied load on the assembly through the stud 54. Thus, whenever the friction force F5 tends to become greater than the friction force F7, the spring finger 111 will lock the actuator 98 to the element 102 in the clockwise adjusting direction and thereby cause the actuator 98 to slip in the recess 97 of the stud head 94 because the friction reaction force F5 becomes greater than the friction reaction force F7. On the other hand, as wear occurs in the assembly the friction reaction force F5 tends to fall below the value of the friction force F7 and this then permits the actuator 98 in the adjusting clockwise direction to drive the element 102 relative to the element 101 in order to reestablish an increase in the friction reaction force F5 and raise the value thereof again toward the point 119. The point 117 of the graph of FIG. 11 should never be returned to once the assembly has been properly put together and installed, as this point represents the necessary friction required in the spring finger 111 to override the projections 108 and thereby not reverse the adjustment of the element 102 relative to the element 101. In other words, it is desirable to permit the stud head 94 and the actuator 98 to rotate in one direction without disturbing the positions of the elements 101 and 102, but in the opposite direction of rotation to always have the assembly urging the elements 101 and 102 to adjust out looseness.

While certain preferred embodiments of this invention are shown and described, the full scope of the invention will be defined by the appended claims.

What is claimed is:

1. A self-adjusting wear compensating movable joint device comprising:

(a) a housing providing a socket having an aperture in one end;

(b) a stud formed with a headed end bearinged in said socket adjacent said aperture, said stud providing a shank projecting outwardly of said aperture, (1) said stud being at least relatively rotatable in said housing socket; and (c) wear compensating means of self-adjusting character operably mounted in said socket between a portion of said housing and said stud headed end, said wear compensating means including:

(1) a first threaded element mounted in said housing, (2) a second threaded element engaged in said first threaded element, said second element having an internal bore, (3) a wear adjusting actuator carried by said headed end of said stud and positioned within said internal bore of said second element, and (4) a series of circumferentially spaced radially inwardly directed projections in the internal bore of said second element, said actuator and projections being [movable past each other] *engageable* in one direction at least of stud rotation whereby said first and second elements are relatively threaded to advance one of said elements toward said headed end of said stud to take-up wear by the relative rotary motion between said housing and stud, *said actuator and projections preventing over-tightening of said joint in said one direction of stud rotation when said wear is taken up.*

2. The device of claim 1 in which said inwardly directed projections are fingers more yieldable in bending in one direction than in the opposite direction.

3. The device of claim 1 in which said inwardly directed projections are rigid, and said actuator includes at least one projection that is yieldable to override said projections.

4. The device of claim 1 in which said first and second elements are relatively threadedly moved by said actuator and expand axially between said housing and said stud.

5. The device of claim 1 in which one of said first and second elements is fixed to said housing and the other is movable, and said actuator engages the movable element for moving it in the wear take-up direction, said actuator and movable element being relatively movable in the opposite direction.

6. The device of claim 1 in which said adjusting actuator is movable relative to said stud headed end, and said inwardly directed projections are fixed to said second element.

7. The device of claim 1 in which said adjusting actuator is relatively rotatable in said stud headed end, said inwardly directed projections are fixed to said second element, and said actuator includes an element engaged with said projections to override said projections in one direction of rotation.

8. The device of claim 1 in which the threaded engagement between said first and second elements generates a greater friction reaction than the friction reaction between one of said elements and the headed end of said stud, and the force required to move said actuator and projections past each other in said one direction is less than the maximum friction reaction between said elements.

*9. The device of claim 1 wherein the actuator is movable past the projections when the stud is rotated relative to said housing in the opposite direction so as to prevent loosening of the joint.*

References Cited

The following references, cited by the Examiner, are of record in the patented file of this patent or the original patent.

UNITED STATES PATENTS

| | | | |
|---|---|---|---|
| 1,186,839 | 6/1916 | Roy | 308—71 |
| 3,112,123 | 11/1963 | True | 287—93XR |
| 3,325,197 | 6/1967 | Wehner | 287—90 |

DAVID J. WILLIAMOWSKY, Primary Examiner

A. V. KUNDRAT, Assistant Examiner

U.S. Cl. X.R.

29—2